United States Patent [19]
Fujita et al.

[11] Patent Number: 5,635,778
[45] Date of Patent: Jun. 3, 1997

[54] MOTOR FOR ELECTRIC PUMPS

[75] Inventors: Toru Fujita, Chiryu; Kozo Hattori, Kuwana; Yukihiro Nishio, Chiryu; Takashi Sato, Obu, all of Japan

[73] Assignee: Nippondenso Co., Ltd., Kariya, Japan

[21] Appl. No.: 363,518

[22] Filed: Dec. 23, 1994

[30] Foreign Application Priority Data

Dec. 24, 1993 [JP] Japan ......................... 5-326471
Oct. 28, 1994 [JP] Japan ......................... 6-264906

[51] Int. Cl.⁶ ......................................... H02N 1/22
[52] U.S. Cl. .............. 310/51; 310/261; 310/216; 74/573 R
[58] Field of Search ............... 310/51, 216, 217, 310/86, 261; 74/573 R

[56] References Cited

U.S. PATENT DOCUMENTS

| | | | |
|---|---|---|---|
| 2,236,244 | 3/1941 | Cornelius | 230/58 |
| 2,675,759 | 3/1954 | Yarger | 103/42 |
| 3,226,579 | 12/1965 | Bygdnes | 310/51 |
| 4,012,653 | 3/1977 | Shigeta et al. | 310/217 |
| 4,644,201 | 2/1987 | Tani et al. | 310/51 |
| 4,836,755 | 6/1989 | Nitche et al. | 417/368 |

FOREIGN PATENT DOCUMENTS

| | | |
|---|---|---|
| 566067 | 10/1993 | European Pat. Off. . |
| 878445 | 6/1953 | Germany . |
| 133204 | 9/1974 | Japan . |
| 4248345 | 9/1992 | Japan . |

OTHER PUBLICATIONS

Patent Abstracts of Japan: vol. 011, No. 250, (M–616), 14 Aug. 1987, & JP–A–62 058067, Mar. 13, 1987.

Patent Abstracts of Japan: vol. 011, No. 250, (M–616), 14 Aug. 1987, & JP–A–62 058066, Mar. 13, 1987.

*Primary Examiner*—Steven L. Stephan
*Assistant Examiner*—Michael Wallace, Jr.
*Attorney, Agent, or Firm*—Cushman, Darby & Cushman, IP Group of Pillsbury Madison & Sutro, L.L.P.

[57] ABSTRACT

A motor for electric pumps which can easily prevent unbalance caused by the eccentricity of an armature shaft when the motor is in rotation by forming holes in a plurality of armature core sheets. In the motor for electric pumps with an armature shaft forming the spindle of the motor and being provided with an eccentric portion for driving a piston pump, hole portions are provided in a plurality of core sheets fit on the armature shaft. The hole portions are formed such that eccentricity of the armature shaft due to the eccentric portion can be offset. The hole portions are provided in positions where the unbalance caused by both the eccentric portion and the piston pump that is driven by the eccentric portion are offset, or at least the unbalance forces generated during rotation are minimized.

19 Claims, 5 Drawing Sheets

MOTOR FOR ELECTRIC PUMPS

CROSS REFERENCE TO RELATED APPLICATIONS

This application is based upon and claims priority from Japanese Patent Applications 5-326471 filed Dec. 24, 1993 and 6-264906 filed Oct. 28, 1994, the contents of each being incorporated herein by reference.

BACKGROUND OF THE INVENTION

1. Field of the Invention

The present invention generally relates to a motor for electric pumps that forcefully feeds oil or other fluids. More particularly, the present invention relates to a motor for electric pumps that forcefully feeds oil or other fluids by driving a piston pump and a method of balancing motor rotation.

2. Related Art

In a conventional motor for electric pumps that drives a piston pump in order to forcefully feed oil or other fluids, as illustrated in FIG. 6, armature shaft 107 forms the spindle of the motor for electric pumps and is provided with eccentric portion 108 for driving piston pump 104. Alternatively, a conventional motor for electric pumps may employ an eccentric cam (not illustrated) instead of eccentric portion 108 of armature shaft 107. In either case, armature shaft 107 is unbalanced due to eccentric portion 108 or the eccentric cam, and as a result, the smooth rotation thereof is impeded.

To solve the above problem, a rotor of motors for electric piston pumps is disclosed in Japanese Unexamined Patent Publication No. 4-248345. In this publication, a first balance weight and a second balance weight are mounted on the armature shaft at both sides of the core in order to offset the eccentricity caused by the eccentric portion of the armature shaft for driving the piston pump.

Nevertheless, in motor 100 for electric pumps composed as above, parts forming first and second balance weights 105 and 106 are essential for achieving the smooth rotation of the armature shaft 107. A production process for mounting the above parts on armature shaft 107 is also required. These requirements not only bother the improvement of the productivity of motor 100 for electric pumps but also cause an increase in the production cost.

In addition, as the balance weights 105 and 106 are mounted on armature 102 at both sides of the core, another problem exists; the size and shape of the balance weights are restricted.

SUMMARY OF THE INVENTION

In view of the above problem, the present invention has an object to provide a motor for electric pumps that easily and economically prevents unbalance of the armature shaft when the motor is in rotation.

To solve the above problem, the motor for electric pumps according to the present invention is provided with an eccentric portion on the armature shaft thereof forming the spindle of the motor for driving the piston pump. Hole portions for countering the unbalance caused by the eccentric portion are provided in a plurality of core sheets fit on the armature shaft in a position where the eccentricity of the armature shaft due to the eccentric portion thereof is offset when the armature shaft is in rotation.

In the above motor for electric pumps according to the present invention, the hole portions may also be provided in a position where unbalance caused by the decentered center axis of the armature shaft is offset respectively when the armature shaft is in rotation.

When the motor for the electric piston pump provided with the eccentric portion for driving the piston thereof is driven and the armature shaft composing the output shaft rotates, the unbalance caused by the eccentric portion and the unbalance caused by the hole portions formed in armature core sheets offset one another. In this way, the unbalance of the armature shaft can be regulated and smooth rotation of the motor can be achieved.

BRIEF DESCRIPTION OF THE DRAWINGS

Other objects, features and characteristics of the present invention will be appreciated from a study of the following detailed description and the appended claims and drawings. In the drawings:

DETAILED DESCRIPTION OF THE PRESENTLY PREFERRED EXEMPLARY EMBODIMENTS

The present invention will now be described through the preferable embodiments thereof illustrated in the appended drawings.

Figure 1:
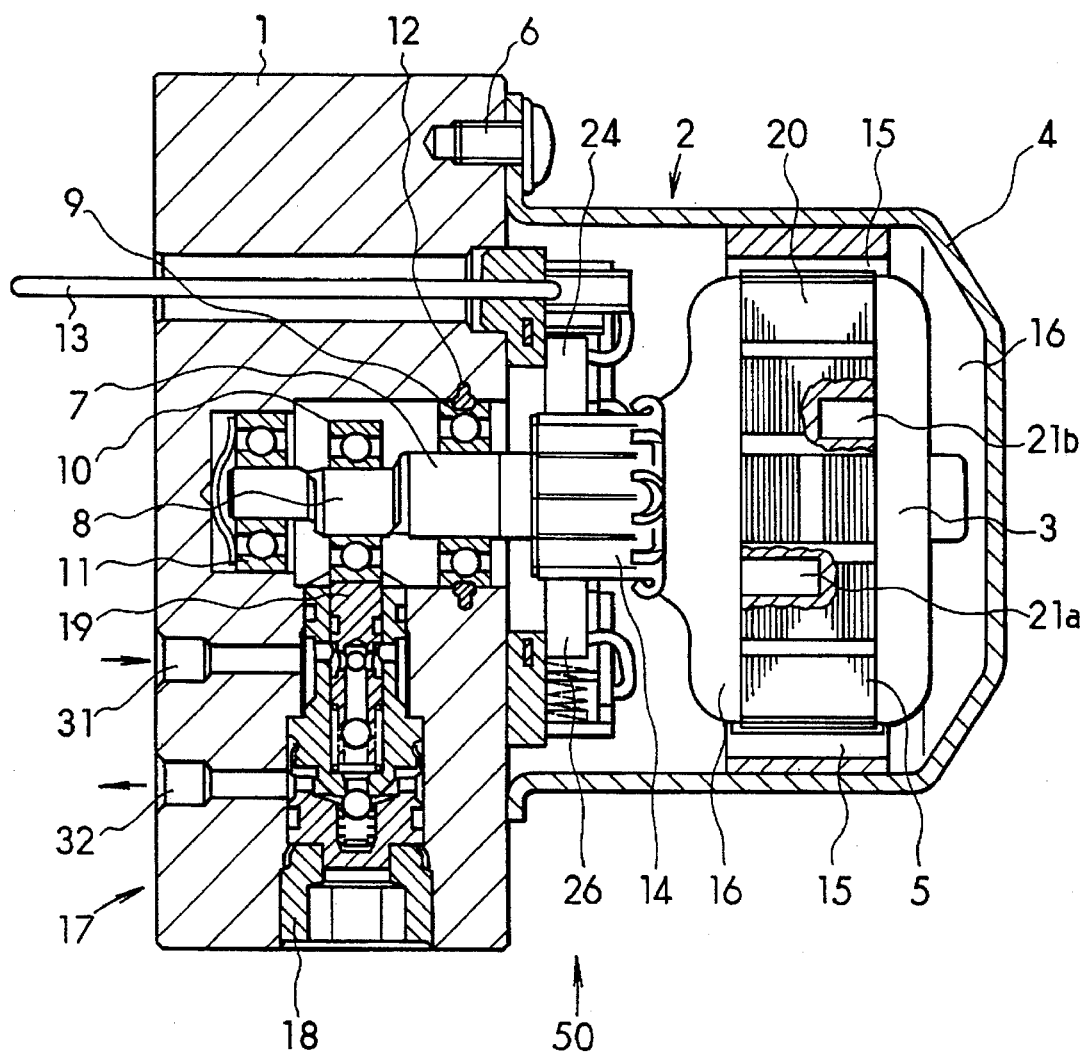
FIG. 1 is a side sectional view illustrating the first embodiment of the motor for electric pumps according to the present invention.
Figure 3:
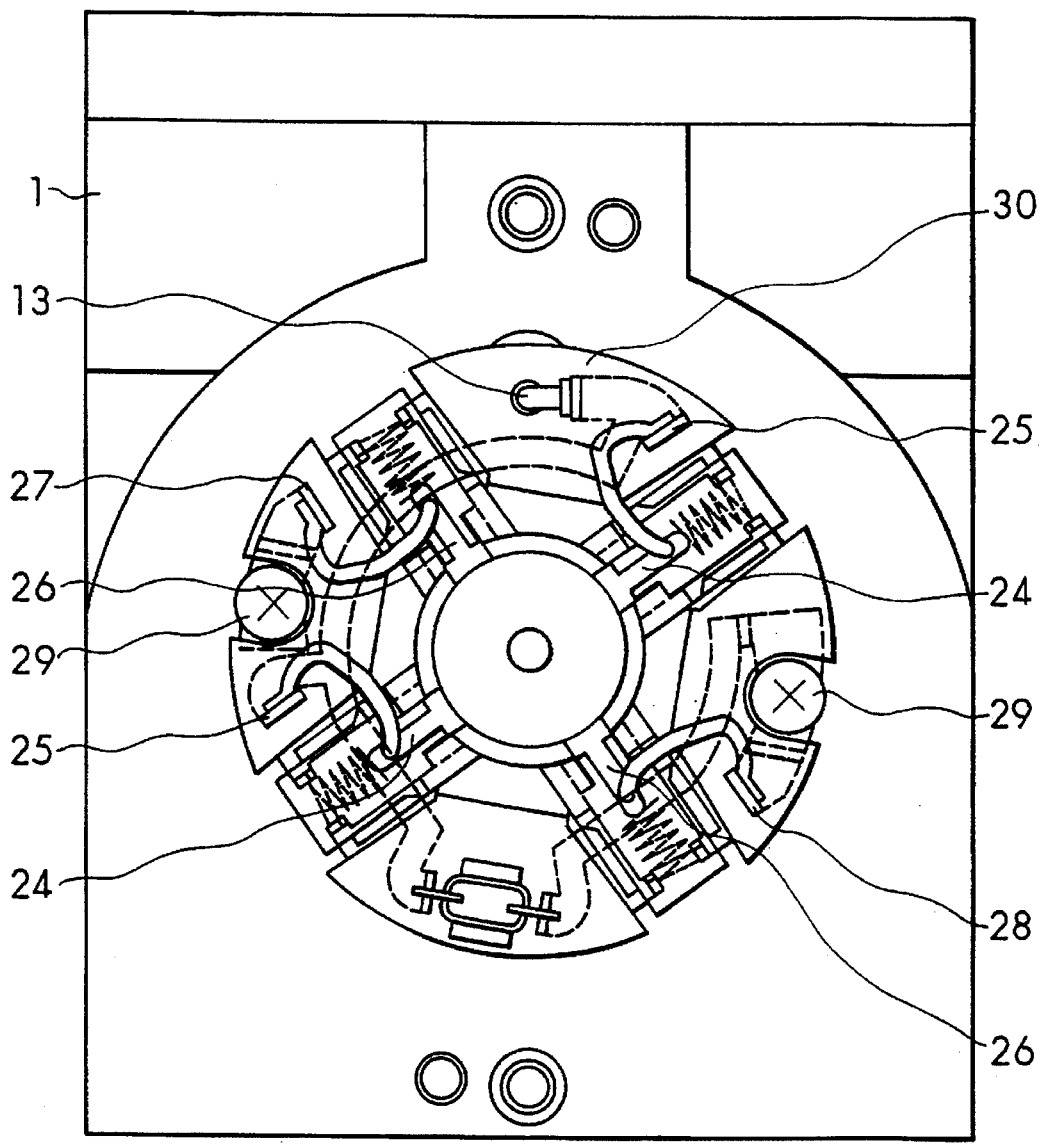
FIG. 3 is a front view illustrating the first embodiment of the motor for electric pumps according to the present invention.

FIGS. 1 and 3 illustrate the first embodiment of motor 50 for use in electric pumps according to the present invention. In motor 50 for electric pumps, pump housing 1 is almost cylindrical and is formed by means of die casting, for example. Pump housing 1 has inlet 31 and outlet 32 for fluid, such as oil, etc. to be forcefully fed. Fixed to pump housing 1 is supporting bearing 9 for armature 3 where bearing 9 is formed of, for example, resin. Bearing 9 is held in place by housing recessed portion 12. Stator 4 of pump-driving motor 2 is connected with housing 1 by set screws 6. Pump housing 1 is provided with pump part 17 in the radial direction thereof. Pump part 17 is fixed to pump housing 1 with screw 18. Piston 19 is in contact with eccentric bearing 10, which fits eccentric portion 8 of armature shaft 7. As the details of such a composition of this kind of pump have been known to public, the further description thereof will be omitted below.

Next, description will be given to pump driving motor 2. Pump driving motor 2 is formed of a magneto DC motor and includes armature shaft 9 as an output shaft, armature 3 provided on armature shaft 7 and commutator 14 for supplying electricity to winding 16 wound on armature 3.

Pump driving motor 2 further comprises cylindrical stator 4 fixed to pump housing 1, arc magnet 15 fixed to the inner periphery of stator 4 so as to face armature core 20 and brushes 24 and 26 in sliding contact with commutator 14.

As illustrated in FIG. 3, positive brush 24 of pump-driving motor 2 is connected to terminal 13 through terminal 25, and terminal 13 is connected to a positive power source (not illustrated). Negative brush 26 is connected to pump housing 1 through terminals 27 and 28. Terminals 27 and 28 are connected to a negative power source (not illustrated) and are formed integrally with resin-made brush holder 30. Resin-made brush holder 30 is fixed to pump housing 1 with screws 29. The pump-driving motor 2 thus structured is supplied with electricity for rotation.

Armature 3 is cantilevered by pump housing 1 through supporting bearing 9 and supporting bearing 11. Core 20 of armature 3 is composed of stacks of core sheets 5 and forcefully fit on armature shaft 7.

Figure 2A:
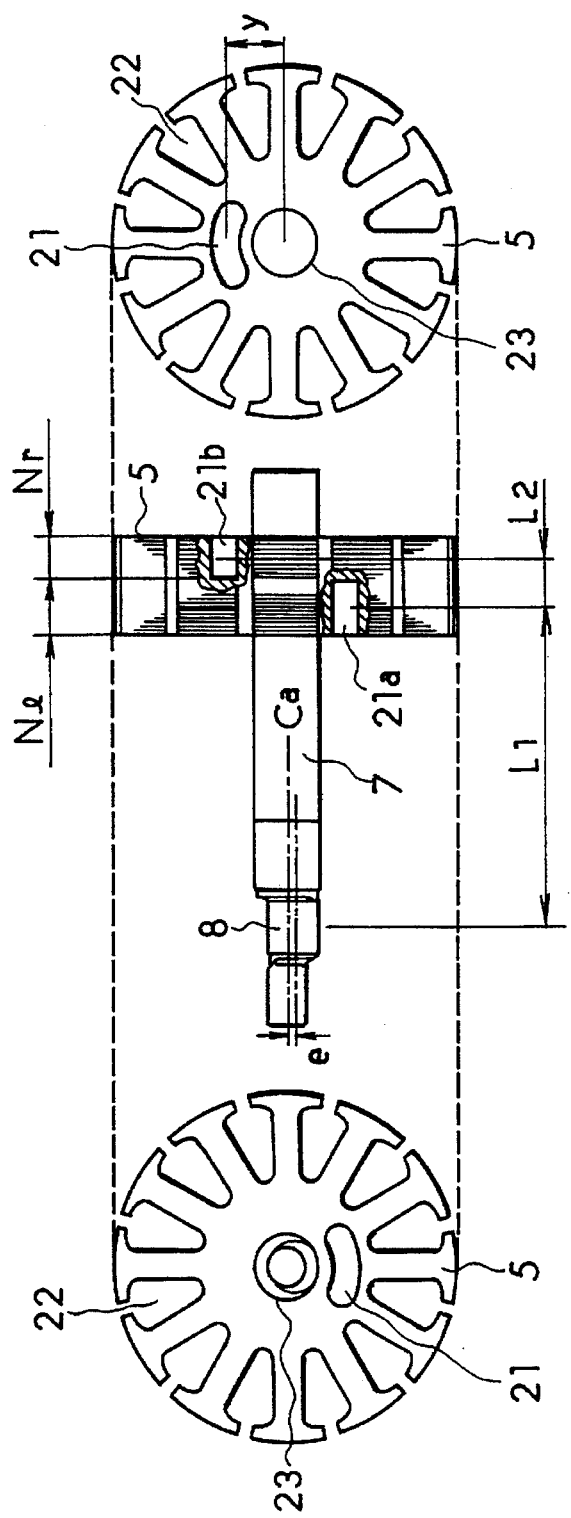
FIG. 2A is a schematic view of the armature shaft and armature core illustrating the first embodiment of the motor for electric pumps according to the present invention.

As illustrated in FIG. 2A, in each of the plurality of core sheets 5 is formed hole portion 21 made by means of press punching, for example. Here, eccentric portion 8 of armature shaft 7 is decentered by a distance e in the lower direction as viewed in FIG. 2A from center axis ca of armature shaft 7 in the static state. In order to prevent the above eccentricity, hole portion 21a is formed in armature core 20 in the direction of the eccentricity due to eccentric portion 8 by press punching respective core sheets 5. The center of gravity of armature shaft 7 and armature core 20 in the direction of center axis ca can be shifted to a higher position as shown in FIG. 2A. In addition, to maintain balance when armature shaft 7 is in rotation, hole portion 21b is formed in armature core 20 in the same way as is hole portion 21a, with hole portion 21b being formed at a position axially farther from eccentric portion 8 than hole portion 21a. By forming hole portions 21a and 21b in the direction of eccentricity of armature shaft 7 and in the direction opposite thereto respectively, the hole portion 21b counters the eccentricity of armature shaft 7 due to eccentric portion 8 thereof, resulting in smooth rotation of motor 2.

As described above, hole portions 21a and 21b are positioned symmetrically with respect to armature shaft 7, but are positioned at different distances from eccentric portion 8. The purpose of this structure is to allow the centrifugal forces generated during rotation of armature shaft 7 act on the weight due to the eccentricity of eccentric portion 8 and the weight removed by the formation of hole portions 21a and 21b so that the occurrence of any unbalance caused by the displacement of center axis ca of armature shaft 7 inclined at a certain angle can be minimized.

A method for determining the optimum position of hole portions 21a and 21b and the optimum weight to be removed will be described using the following equations 1 through 5.

Equation 1:

$$U1=(M1+M2) \times e$$

Equation 2:

$$U2=m \times y \times Nl$$

Equation 3:

$$U3=m \times y \times Nr$$

Equation 4:

$$U=U1-U2+U3$$

Equation 5:

$$Uc = \frac{L1}{L1+L2} \times U1 - \frac{L2}{L1+L2} \times U3$$

where,

L1 is the distance from the axial center of the left half part of armature core 20 to the axial center of eccentric portion 8;

L2 is the distance from the axial center of the right half part of armature core 20 to the axial center of the left half part of armature core 20;

e is the amount of eccentricity to armature shaft 7;

M1 is the weight of eccentric bearing 10;

M2 is the weight of eccentric portion 8 of armature shaft 7;

m is the mass of material removed from respective hole portions 21a and 21b per core sheet;

y is the distance from the center axis of armature shaft 7 to the center of gravity of respective hole portions 21a and 21b;

Nl is the number of core sheets 5 at the left half side of armature core 20;

Nr is the number of core sheets 5 at the right half side of the armature core 20;

U1 is the moment at eccentric portion 8;

U2 is the moment at the left half side of armature core 20;

U3 is the moment at the right half side of armature core 20;

U is the static unbalance amount of armature core 20 and armature shaft 7; and

Uc is the dynamic unbalance amount (even unbalance amount) of armature core 20 and armature shaft 7.

In the above equations, masses Nl×m and Nr×m of material removed from hole portions 21a and 21b of the core sheet respectively and the distance y from the center axis of armature shaft 7 to the center of the gravity of respective hole portions 21a and 21b are determined so that unbalance amount U of armature core 20 and armature shaft 7 in the static state is 0 and unbalance amount Uc of armature core 20 and armature shaft 7 in rotation, i.e., the even unbalance amount, is also 0. Hole portions 21a and 21b are formed with their position and the weight of material removed determined as explained above.

According to the above structure, the unbalance caused by eccentric portion 8 can be countered without mounting any balance weights on the armature shaft as taught by the prior art. Furthermore, hole portions 21a and 21b can be formed simultaneously with the formation of slot portions 22 of core sheet 5 (through which the winding 16 is formed) and/or the formation of portion 23 of core sheet 5 meant to be forcefully fit to armature shaft 7 by means of press punching. Accordingly, the structure for countering the unbalance due to eccentric portion 8 can be formed without the addition of any special manufacturing steps. In addition, when hole portions 21a and 21b are formed at the left and right sides of armature core 20 respectively, hole portions 21a and 21b can be formed simultaneously by forming holes in core sheets 5 aligned in a particular manner and then rotating a predetermined number of core sheets 5 by 180 degrees prior to fastening the core sheets 5 to armature shaft 7. By forming the armature core 20 in this manner, the production cost can be significantly reduced and productivity can be improved.

Furthermore, as armature core 20, or armature core sheets 5, have the same effect as balance weights in the prior art, winding 16 to be wound through slot portions 22 and commutator 14 is free from damage. This allows armature 3 and therefore pump-driving motor 2 to be downsized.

The present invention should not be limited to the above embodiment, but rather includes at least the modifications described below.

For example, although armature shaft 7 itself includes eccentric portion 8 in the above embodiment, the armature shaft 7 may be a coaxial shaft and be provided with an eccentric cam which is supported by eccentric bearing 10. Such a structure can have the same effect as the above-described embodiment.

Furthermore, although core sheets 5 of armature core 20 are most suitably punched to form the hole portions 21 therein for countering the eccentricity of armature shaft 7 in the above embodiment, the eccentricity due to the eccentric portion 8 may be countered by scooping material out of the armature shaft 7 itself or forming a hole portion in armature shaft 7.

In addition, although core sheets 5 of the same shape are used for both the right and left sides of armature core 20 in the above embodiment, core sheets 5 may have different hole shapes to form the right and left sides of armature core 20.

Figure 2B:
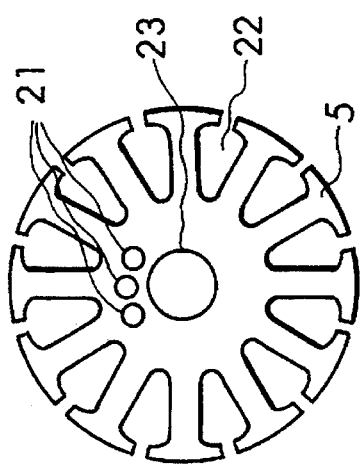
FIG. 2B illustrates a modification of the embodiment of a core sheet.

Moreover, although hole portions 21a and 21b are positioned in the direction of eccentricity due to eccentric portion 8 and in the direction opposite thereto, respectively, to counter the unbalance due to eccentric portion 8 in the above embodiment, the hole portions may be provided in three, four, or more locations in order to counter the unbalance caused by eccentric portion 8 as shown in FIG. 2B. In this case, however, the total mass material removed from the hole portions should be set to be equal to the above described mass Nr×m and Nl×m. Furthermore, the center of gravity of the plurality of hole portions having the effect of hole portion 21a should be set to be equal to the center of hole portion 21a, and likewise, the center of gravity of the plurality of hole portions having the effect of hole portion 21b should be set to be equal to the center of hole portion 21b. In this way, a plurality of hole portions may be formed in armature core 20.

Furthermore, core sheets 5 of the same shape having hole portions 21 press punched in the same way are turned upside down by 180 degrees before force fitting the same on armature shaft 7 to form hole portions 21a and 21b in the above embodiment. However, if the distance from the eccentric portion 8 of armature shaft 7 to armature core 20 is relatively short, the unbalance can be countered without turning the core sheets 5 upside down by 180 degrees before force fitting the same on armature shaft 7 by press punching a hole in one position or a plurality of holes of different shapes around the center of rotation in core sheet 5 and setting the respective holes to the optimum size.

Next, the second embodiment of the present invention will be described.

The first embodiment described above aims to maintain the balance of armature 3 and armature shaft 7 taking only the weight of the eccentric portion 8 and eccentric bearing 10 into consideration.

However, in actual products, it is very difficult to completely nullify the unbalance amount of armature 3 and armature shaft 7. Moreover, in an attempt to reduce the unbalance amount to as close as possible to zero, the control of the tolerance of the parts and the assembly thereof, etc., should be tightened, which increases the production cost.

In the second embodiment, therefore, a small amount of unbalance remains uncountered in armature 3 and armature shaft 7, and the second embodiment proposes a structure for preventing vibrations due to the residual unbalance. This structure is described below.

Where the second embodiment has the same structure as that found in the first embodiment, such parts will not be redescribed herein. Rather, such duplicate description is omitted. In the second embodiment, however, a balance weight, putty, or the like may be added to maintain the balance in addition to forming hole portions 21 in core sheets 5 as in the first embodiment.

The second embodiment further takes into consideration the mass of the movable portion (mainly piston 19) of pump part 17 driven by eccentric bearing 10 in balancing armature 3 and the armature shaft 7. Hereinafter, description will be given to a theory to support the second embodiment.

When power is supplied to motor 2, armature 3, and armature shaft 7 rotate. Then, eccentric portion 8 provided on armature shaft 7 rotates, whereby eccentric bearing 10 reciprocates piston 19 of pump part 17. The shift of the mass of piston 19 caused by the reciprocation thereof causes vibration in the direction of the motion axis of piston 19. On the other hand, in armature 3 and armature shaft 7, by forming the hole portions 21 in core sheets 5, for example, in order to cause unbalance in the direction opposite to the direction of the eccentricity due to the eccentric portion 8, the movement of the unbalance opposes the movement of piston 19 in phase. This structure allows vibrations caused by the shifting of the mass of piston 19 to be reduced.

As eccentric portion 8 and eccentric bearing 10 are in rotation, however, even if the unbalance amount is set only to offset the vibration caused by the reciprocation of the piston 19, the vibration caused by the unbalance remains in the direction other than that of the above motion axis due to the shift of the mass of the unbalance amount. As this vibration may cause noises, etc., this vibration should be eliminated.

Accordingly, it is preferable that the composite vibration composed of the vibration caused by piston 19 and that caused by the unbalance amount at the side of the armature 3 and armature shaft 7 should be obtained and the unbalance amount at the side of armature 3 and armature shaft 7 should be set so that the composite vibration can be minimized. The method for setting the unbalance amount will specifically be described with reference to FIG. 4.

Figure 4:
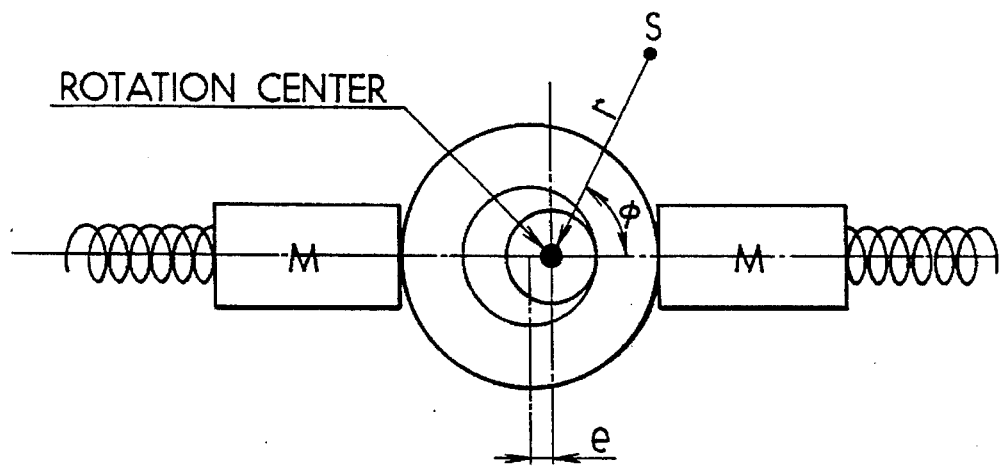
FIG. 4 is a schematic diagram illustrating the positional relationship between the eccentric portion and eccentric bearing and the piston.

FIG. 4 schematically illustrates the positional relation between eccentric portion 8 and eccentric bearing 10 and piston 19. In FIG. 4, when piston 19 is driven by eccentric bearing 10 to reciprocate, the force to cause vibration (vibrating force F1) by the shift of the mass of piston 19 is generated in the direction of the motion axis of piston 19.

The vibrating force F1 can be expressed by the following equation:

Equation 6:

$$F1 = 2 \times mp \times e \times \omega^2 \times \cos \omega t$$

where,

Mp is the mass of the piston;

e is the amount of eccentricity of the shaft; and $\omega$ is the angular velocity of the motor.

On the other hand, the force for causing vibration (vibrating force F2) by the shift of the mass of the static unbalance amount m at the side of the armature 3 and armature shaft 7 can be expressed by the following equation:

Equation 7:

$$F2 = -s \times r \times \omega^2 \times \cos \phi \times \cos \omega t$$

where, s is the static unbalance amount;

r is the radius of rotation from the center of rotation to the center of gravity of the static unbalance amount; and φ is the phase difference between the static unbalance amount from the motion axis of the piston.

Accordingly, when the above vibrating forces F1 and F2 are broken down into forces in the direction of the motion axis of the piston and the direction perpendicular thereto, the following equation can be obtained:

Equation 8:
Vibrating force in the direction of motion axis Fr:

$$Fr = 2 \times Mp \times e \times \omega^2 - s \times r \times \omega^2 \times \cos \phi$$

Equation 9:
Vibrating force in the vertical direction $$Fv = s \times r \times \omega^2$$

Then, the static unbalance amount s is set so that the composite force F composed of the vibrating force Fr in the direction of motion axis and the vibrating force Fv in the direction perpendicular to axis Fr is minimized. The composite force F can be expressed by the following equation:

Equation 10:
$$F = \sqrt{(Fr)^2 + (Fv)^2}$$

By reducing the composite force F, the composite vibration caused according to the composite force F can also be reduced.

The static unbalance amount set according to the above equation is substituted for the moment due to the static unbalance amount in Equation 4 above. Then, the mass Nl×m and Nr×m of the material removed from hole portions 21a and 21b in core sheets 5 and the distance y from center axis ca of armature shaft 7 to the center of gravity of respective hole portions 21a and 21b are determined so that the result of the calculation U1−U2+U3 can be equal to the moment due to the static unbalance amount. With the mass and in the position determined by the above described method, respective hole portions 21a and 21b are formed.

Figure 5:
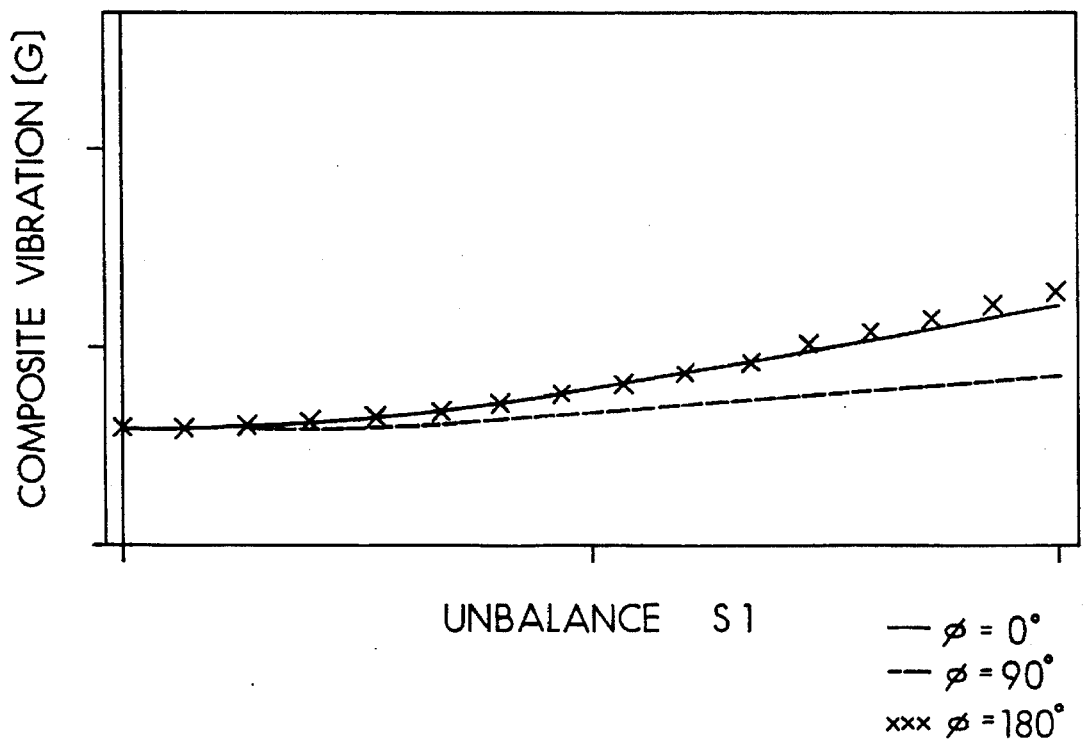
FIG. 5 is a graph illustrating the magnitude of the composite vibration when the armature and the armature shaft are balanced.
Figure 6:
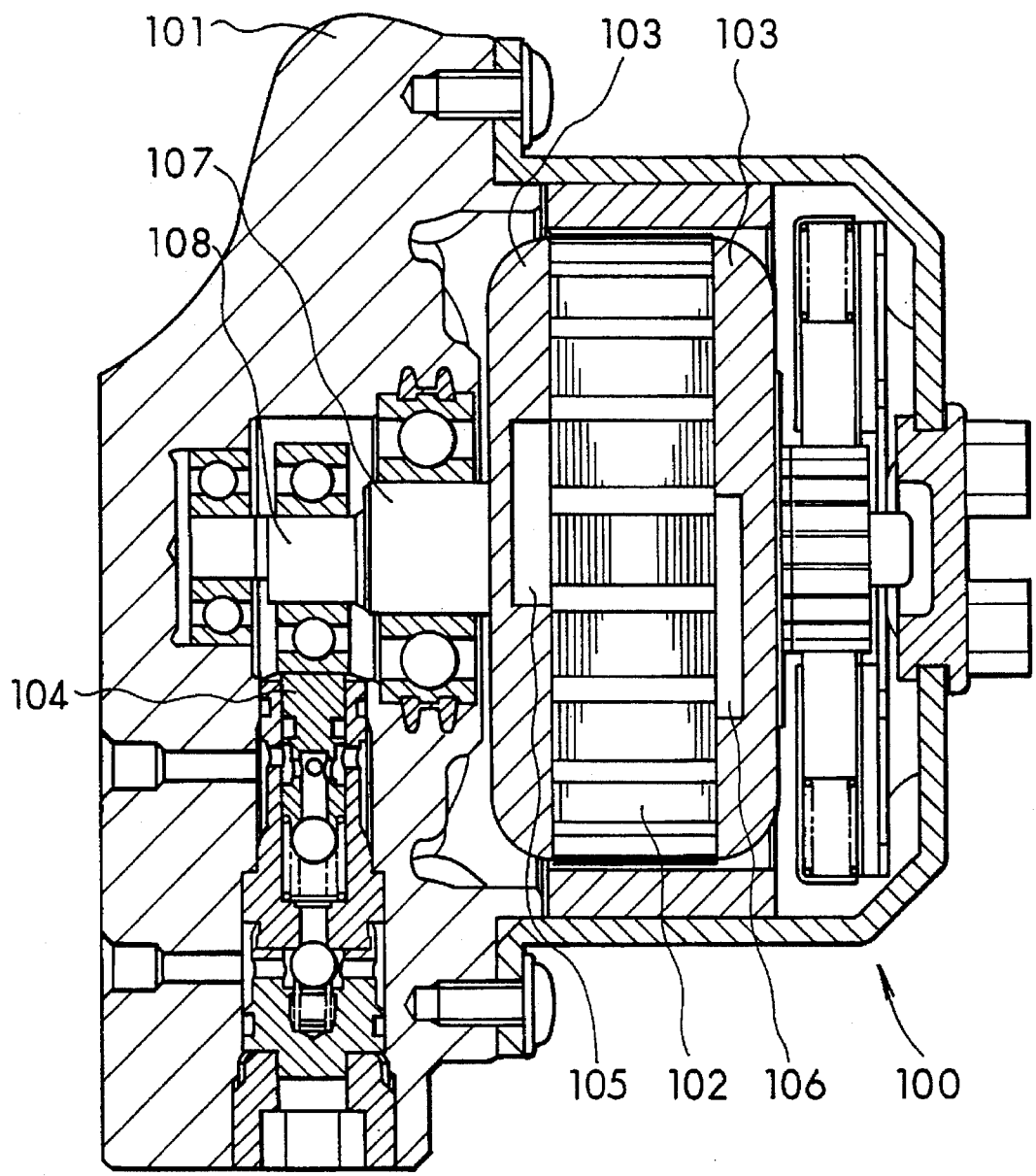
FIG. 6 is a sectional side view illustrating a conventional motor for electric pumps.

FIG. 5 illustrates the magnitude of the composite vibration when armature 3 and armature shaft 7 are balanced by the above method. FIG. 5 indicates the composite vibration at each phase difference φ when unbalance s1 remains after balancing armature 3 and armature shaft 7. It is understood from FIG. 5 that even if some unbalance s1 remains, there is no significant variation in the magnitude of the composite vibration and that even if the phase difference varies, the influence thereof is small. This means that even if unbalance s1 or phase difference φ varies depending on the level of the product, the noise level of each product can be kept at an almost constantly low level.

In the second embodiment, optimum static unbalance s was set based on the Equation 10 and hole 21 was formed on core sheet 21 based on such unbalance s. However, balancing operation in consideration of the piston weight may be performed by first assemblying motor 2 without performing balancing operation beforehand, then rotating motor 2 itself under the condition that the dummy weight corresponding to the weight of bearing 10 and piston 19 is attached to eccentric portion 8 of armature shaft 7, and finally attaching a balancer such as putty or balance weight to rotary portion of the motor for the purpose of eliminating the unbalance.

Further, it is also effective to, after determining the static unbalance amount based on the Equation 10 and performing the balancing operation as discussed in the second embodiment, rotate motor 2 actually with the dummy weight as described above and finely adjust unbalance. Although the static unbalance s cannot always be realized as calculated because of tolerances of component parts and manufacturing errors, this can be compensated for by the fine adjustment by the use of the dummy weight and accuracy in performing the balancing operation can be improved. In this case, since some degree of balancing operation is performed beforehand, the fine adjustment can be performed with ease.

As another method of balance adjusting operation, it is also effective to control phase difference φ of unbalance amount s1. As shown in chart of FIG. 5, even if the umbalance amount s1 remains, the level of the composite vibration can be lowered and variations can be lowered by controlling the range of phase difference φ within a predetermined range. The variation in the level of the composite vibration due to phase difference φ is caused by variation in the degree or extent of synchronization of the vibration of umbalance amount s1 and the vibration of piston 19. Therefore, by controlling phase difference φ to the range where the vibration of unbalance amount s1 and the vibration of piston 19 are less synchronized, the composite vibration can be lowered. It is to be noted that the above control of phase difference φ may be applied to the first and second embodiments.

Exemplary process of controlling the phase difference will be briefly explained. Balancing operation may be performed in consideration of the weight of eccentric portion 8 and eccentric bearing 10 in the first embodiment, and the weight of piston 19 is further taken into consideration in the second embodiment. This balancing operation may be performed by providing holes 21 on core sheet 5 or attaching the putty or the like. Motor 2 itself is rotated under the condition that eccentric bearing 10 is attached to in the first embodiment and the dummy weight in consideration of the weight of the piston is attached to eccentric bearing 10 in the second embodiment, and the phase of unbalance amount ml is measured. Further, an auxiliary balancer such as the putty is attached to the rotary portion of the motor.

Furthermore, static unbalance amount s is set so that the composite vibration due to the reciprocation of piston 19 and the rotation of armature 3 can be reduced in the above second embodiment. However, the unbalance amount may be set so that only the vibration caused by the reciprocation of piston 19 can be offset. In this arrangement, as the source of vibration is only armature 3, etc., a considerable effect can be expected on the noise reduction. Furthermore, as the noise caused by piston 19 is larger than that caused by armature 3, in many cases, it is effective also from this viewpoint to offset the vibration caused by piston 19.

As described above in depth, according to the present invention, a motor for driving electric pumps which can easily prevent the unbalance of the armature shaft when the motor is in operation can be provided at a low cost.

The present invention has been described in connection with what are presently considered to be the most practical and preferred embodiments of the present invention. Of course, the present invention is not to be limited to the disclosed embodiments, but rather is intended to cover all modifications and alternative arrangements included within the spirit and scope of the appended claims.

What is claimed is:

1. A motor, devoid of balancing weights, for electric pumps comprising:

a piston pump;

an armature shaft having an eccentric portion, for driving said piston pump; and an armature that fits on said armature shaft, said armature including:

a core made of a plurality of core sheets, each core sheet having at least one hole portion formed therein before being stacked on said armature shaft;

wherein said hole portions in said core sheets act to counter unbalance caused by rotation of said eccentric portion when said core sheets are mounted on said armature shaft, wherein said core sheets are formed with a first hole portion on the side of said core facing said eccentric portion and a second hole portion on the side of said core facing away from said eccentric portion, and wherein axial lengths of said first hole portion and said second hole portion are determined in relation to axial distances from said eccentric portion and radial/ distances from a central axis of said armature shaft.

2. The motor for electric pumps according to claim 1 wherein said hole portions are provided in said core sheets in directions parallel to an axis of said eccentric portion, and wherein said hole portions in said core sheets have the same shape and are disposed so that said first hole portion incised a hole formed 180 degrees from said second hole portion, and wherein said armature shaft is supported only at a side of said eccentric portion.

3. The motor for electric pumps according to claim 1, wherein the unbalance caused by said eccentric portion includes both a first unbalance caused by said eccentric portion itself and a second unbalance caused by said piston pump being driven by said eccentric portion.

4. A motor, devoid of balancing weights, for electric pumps comprising:

an armature core for rotation;

an armature shaft for rotation with said armature core and having an eccentric portion for driving a piston pump, said armature shaft being rotatably supported only at one side of said armature core near said eccentric portion; and a balancer formed at two axially and radially opposite positions in said armature core and said armature shaft so that the unbalance caused by a movable part of said piston pump may be offset when said armature shaft is in rotation, wherein said balancer includes two hole portions formed in a plurality of core sheets of said armature core at said opposite positions, and wherein the number of said core sheets for each of said hole portions are determined in relation to an axial distance from said eccentric portion and a radial distance from an axial center of said armature shaft.

5. The motor according to claim 4, wherein said balancer is formed on said armature core so that not only the unbalance caused by said movable part of said piston pump but also the unbalance caused by said eccentric portion may be offset.

6. A motor according to claim 5, wherein said balancer is arranged so that the sum of the vibrating force in the direction of reciprocation of said piston pump and the vibrating force generated by rotation of said eccentric portion and the composite force composed of the vibrating forces generated by rotation of said eccentric portion in the direction of said reciprocation and in the direction vertical thereto may be minimized.

7. A motor, devoid of balancing weights, for electric pumps comprising:

a piston pump;

an armature shaft forming a motor spindle and having an eccentric portion for driving said piston pump, said armature shaft being rotatably supported only at one axial side closer to said eccentric portion; and a core disposed on said shaft and having at least two areas where material has been removed therefrom, said two areas being provided axially and radially oppositely to each other and having axial lengths and radial distances from said armature shaft to counter unbalance caused by said eccentric portion wherein one of said axial lengths nearer to said eccentric portion is longer than that of another one of said axial lengths opposite to said one.

8. The motor for electric pumps according to claim 7, wherein said core includes a plurality of core sheets having material removed therefrom in the same arcuate shape to form said areas.

9. The motor for electric pumps according to claim 8, wherein said areas also counter unbalance caused by said piston pump.

10. The motor for electric pumps according to claim 9, wherein said areas are formed so that a sum of a vibrating force in the direction of reciprocation of said piston pump generated by said reciprocation and a vibrating force generated by the rotation of said eccentric portion can be minimized.

11. A device for countering unbalance found in a pump motor that includes a core having a plurality of core sheets, and an armature shaft on which said core is mounted, said armature shaft including an eccentric portion, said device being devoid of balancing weights and comprising:

hole portions formed on a first and second side of said core so as to penetrate said core sheets from opposite directions, said hole portions being disposed symmetrically about a central axis of said armature shaft and being spaced different amounts from an axis of said eccentric portion; wherein said hole portions include a first and second hole of the same shape, said first hole being disposed on said first side and being 180 rotational degrees from said second hole formed on said second side; and wherein axial lengths of said hole portions are determined to reduce unbalance of said armature shaft and said core.

12. A device as claimed in claim 11, wherein said pump motor further includes a pump piston driven by said eccentric portion and wherein said armature shaft is supported only at one axial side closer to said eccentric portion.

13. A device as claimed in claim 11, wherein each of said hole portions includes at least two holes in an arcuate shape.

14. A motor, devoid of balancing weight, for electric pumps comprising:

a piston pump;

an armature shaft having an eccentric portion for driving said piston pump; and an armature that fits on said armature shaft, said armature including:

a core made of a plurality of core sheets, each of which has at least one hole portion formed therein before being stacked on said armature shaft;

wherein said hole portions in said core sheets act to counter unbalance caused by rotation of said eccentric portion when said core sheets are mounted on said armature shaft, wherein said core sheets are formed with a first hole portion on a first axial side of said core facing said eccentric portion and a second hole portion on a second axial side of said core facing away from said eccentric portion, wherein said hole portions are provided in said core sheets in a direction parallel to an axis of said eccentric portion, and wherein said hole portions in said core sheets have the same shape and are disposed so that said first hole portion includes a hole formed 180 degrees from said second hole portion.

15. A motor for electric pumps according to claim 14, wherein said first hole portion and said second hole portion are formed in arcuate shapes around said armature shaft.

16. A motor for electric pumps according to claim 14, wherein each of said hole portions includes at least two holes.

17. A motor for electric pumps according to claim 14, wherein said eccentric portion is provided on said armature shaft forming a part of a motor rotary portion for driving said piston pump, wherein an initial balancer on said motor rotary portion of said motor is provided so that an unbalance caused by said eccentric portion is countered during rotation of said armature shaft;

wherein an auxiliary balancer on said motor rotary portion is provided so that an unbalance remaining after the provision of said initial balancer is limited within a predetermined angular range.

18. A motor for electric pumps according to claim 14, wherein axial lengths of said first hole portion and said second hole portion are determined as a function of axial distances from said eccentric portion and radial distances from an axial center of said armature shaft, to values which substantially reduce both static and dynamic unbalance of said armature core and said armature shaft to zero.

19. A motor for electric pumps according to claim 14, wherein an axial length of said first hole portion is longer than that of said second hole portion.

* * * * *